(12) United States Patent
Katrak et al.

(10) Patent No.: US 6,999,870 B2
(45) Date of Patent: Feb. 14, 2006

(54) VARIABLE FREQUENCY BASED ACCELERATOR PEDAL MODULE AND ELECTRONIC THROTTLE BODY POSITION INDICATORS

(75) Inventors: Kerfegar K. Katrak, Fenton, MI (US); Paul A. Bauerle, Fenton, MI (US); John N. Stockbridge, Novi, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/895,642

(22) Filed: Jul. 21, 2004

(65) Prior Publication Data

US 2005/0024223 A1   Feb. 3, 2005

Related U.S. Application Data

(60) Provisional application No. 60/491,903, filed on Aug. 1, 2003, provisional application No. 60/491,700, filed on Aug. 1, 2003, provisional application No. 60/491,905, filed on Aug. 1, 2003.

(51) Int. Cl.
   *F02D 11/10*   (2006.01)
   *G08B 21/00*   (2006.01)
(52) U.S. Cl. .......................... 701/115; 701/99; 701/102
(58) Field of Classification Search ................ 701/115, 701/99, 102, 48; 123/361, 399
   See application file for complete search history.

(56) References Cited

U.S. PATENT DOCUMENTS 4,215,404 A * 7/1980 Bukhtiyarov et al. ....... 701/102
5,172,785 A * 12/1992 Takahashi ..................... 701/48

FOREIGN PATENT DOCUMENTS

EP          0 871 011 A2 * 10/1998

* cited by examiner

*Primary Examiner*—Hieu T. Vo
(74) *Attorney, Agent, or Firm*—Christopher DeVries (57) ABSTRACT

A control system includes a device having a position between minimum and maximum positions. First and second position sensors sense the position of the device and generate first and second position values. A sensor module generates a first signal waveform based on the first position value and a second signal waveform based on the second position value. The sensor module varies a frequency of the first signal waveform based on the first position value and a frequency of the second signal waveform based on the second position value. A control module communicates with the sensor module and determines the first and second position values based on the frequencies of the first and second signal waveforms, respectively. The sensor module increases the frequency of the first signal waveform and decreases the frequency of the second signal waveform as the device moves from the minimum position to the maximum position.

41 Claims, 4 Drawing Sheets

VARIABLE FREQUENCY BASED ACCELERATOR PEDAL MODULE AND ELECTRONIC THROTTLE BODY POSITION INDICATORS

CROSS-REFERENCE TO RELATED APPLICATIONS

This application claims the benefit of U.S. Provisional Application No. 60/491,903, filed on Aug. 1, 2003, 60/491,700, filed on Aug. 1, 2003, and 60/491,905, filed on Aug. 1, 2003, which are hereby incorporated by reference in their entirety.

FIELD OF THE INVENTION

The present invention relates to vehicle control systems, and more particularly to redundant position sensing of devices in vehicle control systems.

BACKGROUND OF THE INVENTION

Vehicle manufacturers are increasingly replacing mechanical linkages in vehicles with sensors and electro-mechanical devices to reduce weight and cost. For example, sensors are replacing mechanical linkages to detect positions of user operated devices such as accelerator, clutch, and brake pedals. Signals are transmitted from the sensors to controllers and/or electromechanical devices in the vehicle. For example, a signal from an accelerator pedal may be transmitted to an actuator in the electronic throttle body to adjust the position of the throttle blade. Additionally, a throttle position sensor detects the position of the throttle blade and transmits a signal to an engine control module.

In cases where mechanical linkages are at least partially eliminated, multiple sensors are commonly used to perform redundant measurements and ensure system accuracy. For example, some manufacturers use analog position sensors that are based on a resistive ink or paste that is deposited on a non-conducting substrate. Other manufacturers use application specific integrated circuits (ASICs) in combination with sensors. The sensors typically include hall effect or inductively coupled sensors. The ASICs receive analog signals from the sensors and output pulse width modulated (PWM) or other types of signals.

Figure 1:
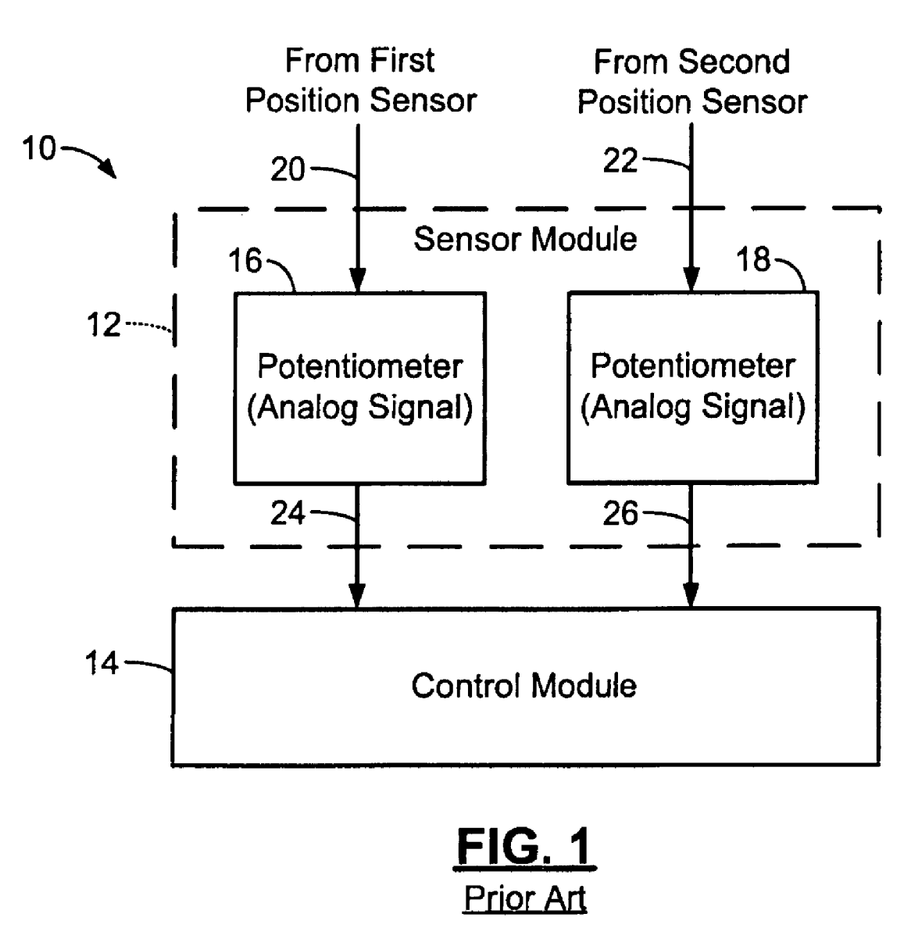
FIG. 1 is a functional block diagram of a sensor module and a control module from a vehicle control system wherein the sensor module converts first and second position values into analog waveforms according to the prior art.

Referring to FIG. 1, a vehicle control system 10 includes a sensor module 12 and a control module 14. For example, the sensor module 12 may be an ASIC. The sensor module 12 includes first and second signal conversion modules 16 and 18, respectively. The signal conversion modules 16 and 18 receive first and second position signals 20 and 22, respectively. The position signals 20 and 22 are from first and second position sensors that detect a position of a device. For example, the device may be an accelerator pedal, brake pedal, clutch pedal, or a throttle blade in a vehicle. The position signals 20 and 22 indicate first and second position values of the device.

The signal conversion modules 16 and 18 convert the position values into first and second analog waveforms 24 and 26, respectively. The signal conversion modules 16 and 18 include mechanical adjustments that adjust characteristics of the analog waveforms 24 and 26. For example, the signal conversion modules 16 and 18 of FIG. 1 include potentiometers that adjust the amplitude and/or duty cycle of the analog waveforms 24 and 26 given a fixed frequency when a position of the device is fixed.

The control module 14 receives the analog waveforms 24 and 26 and decodes the analog waveforms 24 and 26 to recover the first and second position values. The sensor module 12 may use one or multiple shared reference voltages for each of the signal conversion modules 16 and 18. The first and second position values provide an opportunity for the vehicle control system 10 to perform redundant position sensing of devices. However, as the number of sensors increases, the number of wires and overall cost increases.

SUMMARY OF THE INVENTION

A control system according to the present invention includes a device having a position between minimum and maximum positions. First and second position sensors sense the position of the device and generate first and second position values, respectively. A sensor module communicates with the first and second position sensors. The sensor module generates a first signal waveform based on the first position value and a second signal waveform based on the second position value. The sensor module varies a frequency of the first signal waveform based on the first position value and a frequency of the second signal waveform based on the second position value. A control module communicates with the sensor module and determines the first and second position values based on the frequencies of the first and second signal waveforms, respectively.

In other features, the sensor module increases the frequency of the first signal waveform and decreases the frequency of the second signal waveform as the device moves from the minimum position to the maximum position. The control module increases the frequency of the first signal waveform from a first frequency when the device is at the minimum position to a second frequency when the device is at the maximum position. The control module decreases the frequency of the second signal waveform from the second frequency when the device is at the minimum position to the first frequency when the device is at the maximum position. The control module increases the frequency of the first signal waveform from a first frequency when the device is at the minimum position to a second frequency when the device is at the maximum position. The control module decreases the frequency of the second signal waveform from a third frequency that is between the first and second frequencies when the device is at the minimum position to a fourth frequency that is less than the first frequency when the device is at the maximum position.

In still other features of the invention, the control module increases the frequency of the first signal waveform from a first frequency when the device is at the minimum position to a second frequency when the device is at the maximum position. The control module decreases the frequency of the second signal waveform from the first frequency when the device is at the minimum position to a third frequency that is less than the first frequency when the device is at the maximum position. The control module increases the frequency of the first signal waveform from a first frequency when the device is at the minimum position to a second frequency when the device is at the maximum position. The control module decreases the frequency of the second signal waveform from the second-frequency when the device is at the minimum position to a third frequency that is between the first and second frequencies when the device is at the maximum position. The sensor module increases both of the frequency of the first signal waveform and the frequency of the second signal waveform as the device moves from the minimum position to the maximum position. The second module decreases both of the frequency of the first signal waveform and the frequency of the second signal waveform as the device moves from the minimum position to the maximum position.

In yet other features, the first and second signal waveforms are one of square, triangular, trapezoidal, or sinusoidal waveforms. The control module detects voltage bias conditions in the first and second signal waveforms. A first resolution of the first position sensor is greater than a second resolution of the second position sensor. The control module applies a weighting factor to the first position value and/or the second position value to compare the first and second position values. First and second conductors have first ends that communicate with the sensor module and second ends that communicate with the control module. The control module transmits the first signal waveform on the first conductor and the second signal waveform on the second conductor.

In still other features of the invention, the control module compares the frequencies of the first and second signal waveforms and activates an alarm indicator when a sum of the frequencies of the first and second signal waveforms is at least one of greater than a first predetermined frequency and/or less than a second predetermined frequency. The control module compares the first and second position values and activates an alarm indicator when a difference between the first and second position values is greater than a predetermined value. The control module converts the first and second position values into first and second normalized values that represent a fraction of a range between the minimum and maximum positions of the device. The control module compares the first and second normalized values and activates an alarm indicator when a difference between the first and second normalized values is greater than a predetermined value.

In yet other features, the control module includes a frequency filter that detects frequency shifting in the first signal waveform and/or the second signal waveform. The frequency filter is one of a low pass filter or a bandpass filter. The device is one of an accelerator pedal, a brake pedal, a clutch pedal, or a throttle blade of a vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, a micro-controller with timer I/O, and/or other suitable components that provide the described functionality.

Figure 2:
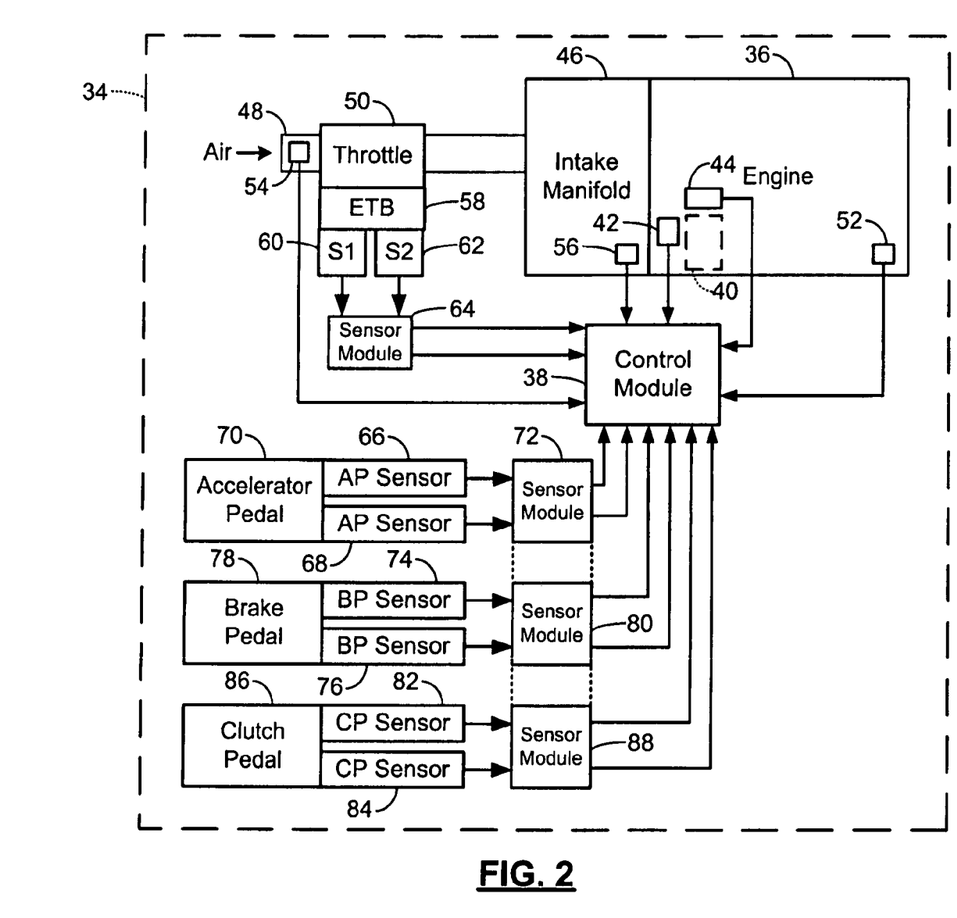
FIG. 2 is a functional block diagram of a vehicle control system including a control module that receives signals from vehicle sensors according to the present invention.

Referring now to FIG. 2, a vehicle 34 includes an engine 36 and a control module 38. The engine 36 includes a cylinder 40 that has a fuel injector 42 and a spark plug 44. Although a single cylinder 40 is shown, those skilled in the art can appreciate that the engine 36 typically includes multiple cylinders 40 with associated fuel injectors 42 and spark plugs 44. For example, the engine 36 may include 4, 5, 6, 8, 10, 12, or 16 cylinders 40.

Air is drawn into an intake manifold 46 of the engine 36 through an inlet 48. A throttle blade 50 regulates air flow through the inlet 48. Fuel and air are combined in the cylinder 40 and are ignited by the spark plug 44. The throttle blade 50 controls the rate that air flows into the intake manifold 46. The control module 38 adjusts the rate that fuel is injected into the cylinder 40 based on the air that is flowing into the cylinder 40 to control the air/fuel (A/F) ratio within the cylinder 40. The control module 38 communicates with an engine speed sensor 52 that generates an engine speed signal. The control module 38 also communicates with mass air flow (MAF) and manifold absolute pressure (MAP) sensors 54 and 56, which generate MAF and MAP signals, respectively.

The engine 36 includes an electronic throttle body (ETB) 58 that is associated with the throttle blade 50. The ETB 58 is controlled by the control module 38 and/or a dedicated controller such as an electronic throttle controller (ETC); First and second throttle position sensors 60 and 62, respectively, detect a position of the throttle blade 50 in the ETB 58 and generate first and second position signals that represent the position of the throttle blade 50. The first and second position signals are received by a sensor module 64. For example, the sensor module 64 may be an application specific integrated circuit (ASIC). The sensor module 64 transmits first and second signals to the control module 38 that have variable frequencies as will be described in further detail below.

The vehicle 34 optionally includes first and second accelerator pedal (AP) position sensors 66 and 68, respectively, that detect a position of the AP 70. The first and second AP position sensors, 66 and 68, respectively, generate first and second position signals that represent the position of the AP 70. A sensor module 72 receives the first and second position signals and transmits variable frequency signals to the control module 38.

The vehicle 34 optionally includes first and second brake pedal (BP) position sensors 74 and 76, respectively, that detect a position of the BP 78. The first and second BP position sensors 74 and 76, respectively, generate first and second position signals that represent the position of the BP

78. A sensor module 80 receives the first and second position signals and transmits variable frequency signals to the control module 38.

In the case of a manual transmission, the vehicle 34 optionally includes first and second clutch pedal (CP) position sensors 82 and 84, respectively, that detect a position of the CP 86. The first and second CP position sensors 82 and 84, respectively, generate first and second position signals that represent the position of the CP 86. A sensor module 88 receives the first and second position signals and transmits variable frequency signals to the control module 38. Those skilled in the art can appreciate that sensors other than those shown in FIG. 1 may be employed.

The sensor modules 64, 72, 80, and 88 generate respective variable frequency signals based on respective first and second position signals. The variable frequency signals include first and second signal waveforms that indicate values of the first and second position signals, respectively. In an exemplary embodiment, the variable frequency of the first signal waveform corresponds to a value of a first position signal, and a variable frequency of the second signal waveform corresponds to a value of a second position signal. Those skilled in the art can appreciate that any of the sensor modules 64, 72, 80, and/or 88 may receive position signals from more than two position sensors for added redundancy.

It is possible to utilize only the first throttle position sensor 60 and still obtain redundant measurements of the position of the throttle blade 50. For example, other sensors such as the MAF and MAP sensors 54 and 56, respectively, indicate a flow rate and/or a pressure of the air in the intake manifold 46 that may be used to determine a position of the throttle blade 50. In this case, the sensor module 64 generates a single signal waveform with a variable frequency that is based on a value of the first position signal from the first throttle position sensor 60. However, it is difficult to accurately compare the position of the throttle blade 50 from the first throttle position sensor 60 and from the MAF and/or MAP sensors 54 and 56, respectively, in both static and dynamic vehicle conditions. Regardless of the availability of other sensors, it is desirable to utilize both the first and second AP position sensors, 66 and 68, respectively. A failure of a single AP position sensor 66 or 68 would result in a single-point failure and prevent the control module 38 from accurately detecting a position of the AP 70.

The control module 38 decodes the signal waveforms from the sensor modules 64, 72, 80, and 88 to determine position values of respective first and second position signals. In an exemplary embodiment, the control module 38 converts the position values into normalized values that represent a fraction of a range between minimum and maximum positions. For example, a normalized position value for the throttle blade 50 may represent a fraction of the range between an idle throttle position and a wide open throttle (WOT) position.

In this case, a normalized position value of 0% may correspond with the idle throttle position and a normalized position value of 100% may correspond with the WOT position. For example, in an exemplary embodiment, the sensor modules 64, 72, 80, and 88 are preset to output predetermined signal waveforms when positions of their respective vehicle devices 50, 70, 78, and 86 are fixed. For example, sensor module 64 may be preset to output a predetermined signal waveform when the throttle blade 50 is fixed at a maximum airflow throttle position. After the sensor module 64 is preset, the control module 38 may scale decoded position values between the preset position value and a position value that is learned during normal operations to determine a position of the throttle blade 50.

Figure 3:
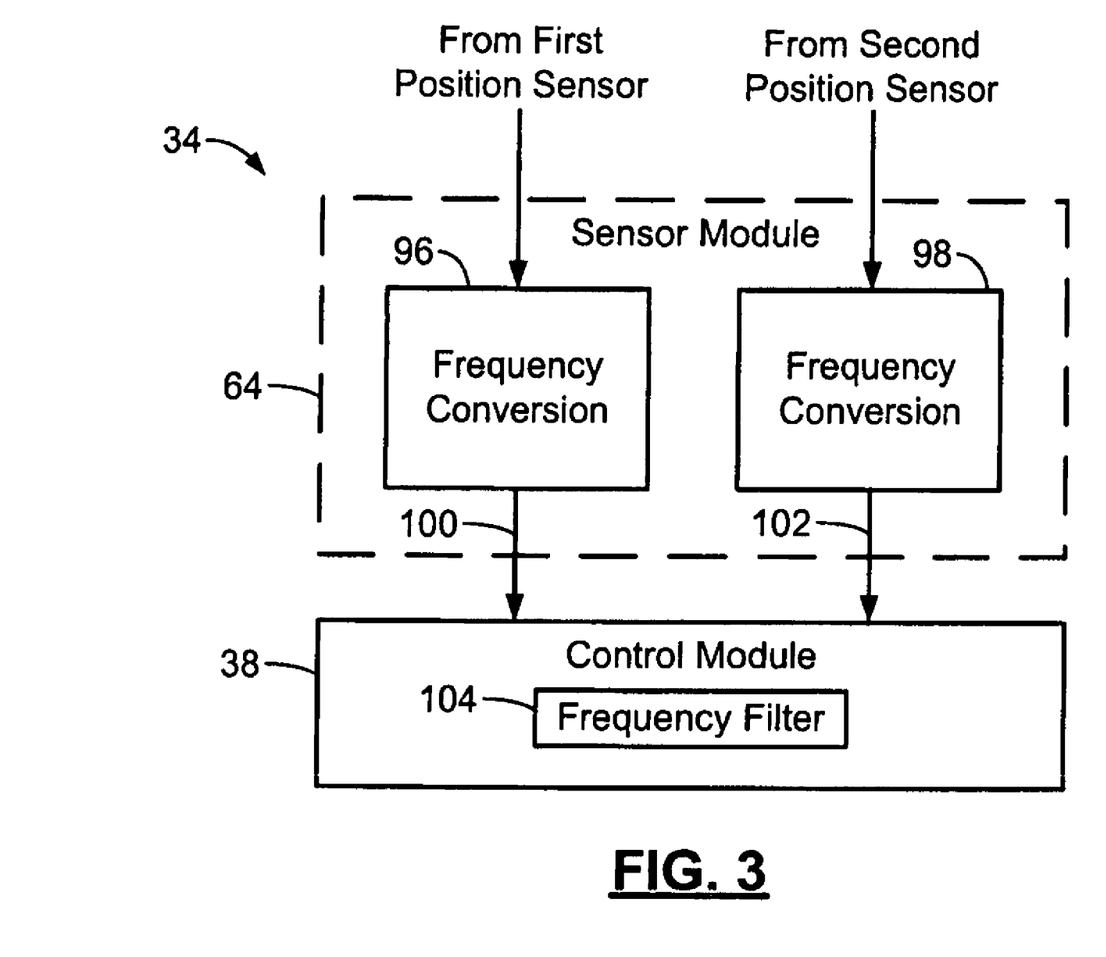
FIG. 3 is a functional block diagram of the sensor module and the control module of FIG. 2 wherein the sensor module converts first and second position values into variable frequency waveforms.

Referring now to FIG. 3, the sensor module 64 and the control module 38 are illustrated in further detail. An exemplary embodiment of the present invention is outlined below with respect to position sensing of the throttle blade 50. However, analogous operation of the sensor module 64 and the control module 38 is contemplated with respect to position sensing of other vehicle devices including the accelerator pedal 70, the brake pedal 78, and the clutch pedal 86. The sensor module 64 includes first and second frequency signal conversion modules 96 and 98, respectively. An input of the first frequency signal conversion module 96 receives the first position signal from the first throttle position sensor 60. The first frequency signal conversion module 96 generates a first signal waveform 100 based on the first position signal. The first frequency signal conversion module 96 also varies a frequency of the first signal waveform 100 based on the value of the first position signal.

An input of the second frequency signal conversion module 98 receives the second position signal from the second throttle position sensor 62. The second frequency signal conversion module 98 generates a second signal waveform 102 based on the second position signal. The second frequency signal conversion module 98 also varies the frequency of the second signal waveform 102 based on the value of the second position signal. The control module 38 receives and decodes the first and second signal waveforms 100 and 102, respectively, to determine the first and second position values.

In an exemplary embodiment, the first frequency signal conversion module 96 increases the frequency of the first signal waveform 100 as a position of the throttle blade 50 moves from a minimum position to a maximum position. For example, the minimum position may be an idle throttle position and the maximum position may be a maximum airflow position. The second frequency signal conversion module 98 decreases the frequency of the second signal waveform 102 as the throttle blade 50 moves from the minimum to the maximum positions. Alternatively, the first and second frequency signal conversion modules 96 and 98, respectively, may both increase or both decrease the frequencies of the first and second signal waveforms 100 and 102, respectively, as the throttle blade 50 moves from the minimum to the maximum positions.

The frequency range of the first signal waveform 100 may overlap or be independent of the frequency range of the second signal waveform 102. In an exemplary embodiment, the first and second signal waveforms 100 and 102, respectively, have identical frequency ranges. For example, the frequency of the first signal waveform 100 ranges from 250 Hz when the throttle blade 50 is in the idle throttle position to 5 kHz when the throttle blade 50 is in the maximum airflow position. Consequently, the frequency of the second signal waveform 102 ranges from 5 kHz when the throttle blade 50 is in the maximum airflow position to 250 Hz when the throttle blade 50 is in the idle throttle position.

In another exemplary embodiment, the first and second signal waveforms 100 and 102, respectively, have skewed frequency ranges. For example, the frequency of the first signal waveform 100 ranges from 500 Hz when the throttle blade 50 is in the idle throttle position to 5 kHz when the throttle blade 50 is in the maximum airflow position. In this case, the frequency of the second signal waveform 102 ranges from 4 kHz when the throttle blade 50 is in the idle throttle position to 250 Hz when the throttle blade 50 is in the maximum airflow position.

In another exemplary embodiment, the frequency ranges of the first and second signal waveforms 100 and 102, respectively, are separated. For example, the frequency of the first signal waveform 100 ranges from 800 Hz when the throttle blade 50 is in the idle throttle position to 8 kHz when the throttle blade 50 is in the maximum airflow position. In this case, the frequency of the second signal waveform 102 ranges from 800 Hz when the throttle blade 50 is in the idle throttle position to 250 Hz when the throttle blade 50 is in the maximum airflow position.

In another exemplary embodiment, the frequency range of the second signal waveform 102 may be a subset of the frequency range of the first signal waveform 100. For example, the frequency of the first signal waveform 100 may range from 250 Hz when the throttle blade 50 is in the idle throttle position to 6 kHz when the throttle blade 50 is in the maximum airflow position. In this case, the frequency of the second signal waveform 102 ranges from 6 kHz when the throttle blade 50 is in the idle throttle position to 2 kHz when the throttle blade 50 is in the maximum airflow position.

The control module 38 determines the frequencies of the first and second signal waveforms 100 and 102, respectively, and converts the frequencies into the first and second position values. Since the frequency ranges of the first and second signal waveforms 100 and 102, respectively, are inverted, the control module 38 sums the first and second frequencies- to determine proper operation of the first and second position throttle position sensors 60 and 62, respectively. For example, the control module 38 may indicate a sensor error condition when the sum of the frequencies of the first and second signal waveforms 100 and 102, respectively, is at least one of greater than a first predetermined frequency and/or less than a second predetermined frequency.

Alternatively, the control module 38 may first convert the frequencies into the first and second position values before comparing the first and second position values to verify proper operation of the first and second throttle position sensors 60 and 62, respectively. In this case, the control module 38 indicates a sensor error when the difference between the first and second position values is greater than a predetermined value. Additionally, the control module 38 may first convert the first and second position values into first and second normalized values that indicate a fraction of the range between the minimum and maximum positions.

In an exemplary embodiment, the control module 38 compares the frequencies of the first and second signal waveforms 100 and 102, respectively, to a clock frequency of an internal microprocessor for accuracy and performance diagnostics. A first resolution of the first throttle position sensor 60 may be greater than a second resolution of the second throttle position sensor 62. In this case, the control module 38 assigns a weighting factor to one or both of the throttle position values for an accurate comparison. Alternatively, when the control module 38 compares the frequencies of the first and second signal waveforms 100 and 102, respectively, the control module 38 assigns a weighting factor to one or both of the frequencies of the first and second signal waveforms 100 and 102, respectively, for an accurate comparison.

Frequency shift may occur in the first and/or second signal waveforms 100 and/or 102 due to RC filter or LC resonance. Therefore, the control module 38 includes a frequency filter 104 that filters the first and second signal waveforms 100 and 102, respectively. For example, the frequency filter 104 may be a low pass filter that blocks signals having frequencies below a predetermined frequency, a bandpass filter that blocks signals having frequencies outside of a predetermined frequency range, or another frequency filter. Additionally, the frequency filter 104 may be a first order or a multiple order filter.

In an exemplary embodiment, the first and second signal waveforms 100 and 102, respectively, are implemented as square waveforms. However, radiated emissions standards may dictate minimum and maximum rise and fall times. Therefore, the waveforms may not be perfectly square. Additionally, other waveform configurations including triangular, trapezoidal, and sinusoidal waveforms are contemplated. In the event that the first and second signal waveforms 100 and 102, respectively, are triangular waveforms, minimum and maximum values for the waveforms are preferably predetermined to limit high/low level times. This minimizes frequency calculation errors at the control module 38. The control module 38 determines the frequency of a triangular waveform based on the rise/fall times of the edges of the waveform.

In the event that the first and second signal waveforms 100 and 102, respectively, are trapezoidal waveforms, radiated emissions standards may dictate minimum and maximum rise and fall times of the waveforms. Minimum and maximum values for the trapezoidal waveforms are preferably predetermined to limit frequency calculation errors. The control module 38 determines the frequency of a trapezoidal waveform based on rise/fall times of the edges as well as the high/low level times of the waveform. In the event that the first and second signal waveforms 100 and 102, respectively, are sinusoidal waveforms, the signal waveforms preferably have minimum and maximum rise time requirements for the linear portion of the sinusoid. For example, the linear portion of the sinusoid may be from 15% to 75% of the waveform.

The sinusoidal waveforms also preferably have high/low level minimum/maximum time requirements for the non-linear portion of the sinusoid to minimize frequency calculation errors at the control module 38. For example, the non-linear portion of the sinusoid may be from 75% to 15% of the waveform. While sinusoidal waveforms have the lowest radiated emissions, they are also typically the most difficult to implement into a system.

In an exemplary embodiment, the square, triangular, and/or trapezoidal waveforms do not switch values close to the reference voltage and the return voltage. In this case, voltage switching in the waveforms occurs in a predefined range that is between the reference and return voltages. For example, when the reference voltage is 5V and the return voltage is 0V, voltage switching may occur between 4.5V and 0.5V. This results in lower oscillations between rising/falling edges and high/low levels in the waveforms. This makes the waveforms appear to be differential and allows for the use of higher frequencies while still complying with radiated emissions standards.

The control module 38 preferably detects voltage bias conditions in the first and second signal waveforms 100 and 102, respectively. For example, the control module 38 may employ analog voltage bias detection to detect short-to-battery and short-to-ground conditions. The control module 38 may also detect other short conditions to other frequency inputs. For example, a typical square wave signal oscillates between 0.5V and 4.5V when there are no failures. If edge detection is performed between 1.5V and 3.5V, short-to-battery and short-to-ground conditions produce a signal with no frequency. However, short conditions to other frequency inputs may be detected when rising and falling edges of the waveform only switch between 1.0V and 4.0V. This allows the control module 38 to diagnose analog voltage bias due to fretting corrosion of input/output (I/O) pins.

Figure 4:
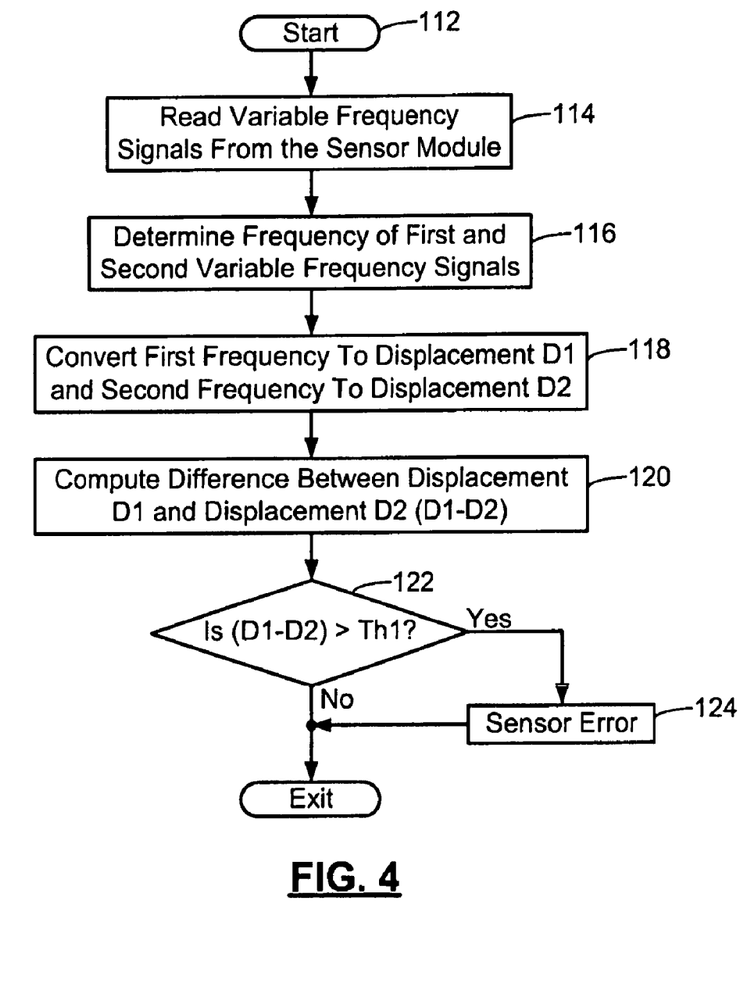
FIG. 4 is a flowchart illustrating steps performed by the control module of FIG. 2 to convert the variable frequency waveforms into position values.

Referring now to FIG. 4, a position redundancy algorithm that is executed by the control module 38 begins in step 112. In step 114, the control module 38 reads the first and second signal waveforms 100 and 102, respectively, from the sensor module 64. In step 116, the control module 38 determines the frequencies of the first and second signal waveforms 100 and 102, respectively. In step 118, the control module 38 converts the frequency of the first signal waveform 100 into a first displacement value and the frequency of the second signal waveform 102 into a second displacement value.

In step 120, the control module 38 computes the difference between the first and second displacement values. It is assumed in step 120 that the first and second displacement values have an equal weight. Therefore, no weighting factors are applied to the first and second displacement values prior to step 120. In step 122, control determines whether the difference between the first and second displacement values is greater than a predetermined value. If false, control ends. If true, control proceeds to step 124. In step 124, the control module 38 activates a sensor error indicator and control ends. In step 124, the control module 38 may also take corrective action such as implementing a weighting factor for one of the throttle position values so that the system remains operational.

The vehicle control system of the present invention allows for redundant position sensing of devices in a vehicle. Variable frequency interfaces have lower current requirements than analog or pulse width modulated (PWM) interfaces. This allows for increased resolution and accuracy. Redundant position sensing may be used in vehicle functions that are separate from the engine control system as well as other applications that require accurate position sensing of devices.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A vehicle control system, comprising:
   a vehicle device having a position between minimum and maximum positions, wherein said vehicle device is one of an accelerator pedal, a brake pedal, a clutch pedal, or a throttle blade of a vehicle;
   first and second position sensors that sense said position of said vehicle device and that generate first and second position values, respectively;
   a sensor module that communicates with said first and second position sensors, that generates a first signal waveform based on said first position value and a second signal waveform based on said second position value, and that varies a frequency of said first signal waveform based on said first position value and a frequency of said second signal waveform based on said second position value; and
   a control module that communicates with said sensor module and that determines said first and second position values based on said frequencies of said first and second signal waveforms, respectively.

2. A control system, comprising:
   a device having a position between minimum and maximum positions;
   first and second position sensors that sense said position of said device and that generate first and second position values, respectively;
   a sensor module that communicates with said first and second position sensors, that generates a first signal waveform based on said first position value and a second signal waveform based on said second position value, and that varies a frequency of said first signal waveform based on said first position value and a frequency of said second signal waveform based on said second position value; and
   a control module that communicates with said sensor module and that determines said first and second position values based on said frequencies of said first and second signal waveforms, respectively.

3. The control system of claim 2 wherein said sensor module increases said frequency of said first signal waveform and decreases said frequency of said second signal waveform as said device moves from said minimum position to said maximum position.

4. The control system of claim 3 wherein said control module increases said frequency of said first signal waveform from a first frequency when said device is at said minimum position to a second frequency when said device is at said maximum position and wherein said control module decreases said frequency of said second signal waveform from said second frequency when said device is at said minimum position to said first frequency when said device is at said maximum position.

5. The control system of claim 3 wherein said control module increases said frequency of said first signal waveform from a first frequency when said device is at said minimum position to a second frequency when said device is at said maximum position and wherein said control module decreases said frequency of said second signal waveform from a third frequency that is between said first and second frequencies when said device is at said minimum position to a fourth frequency that is less than said first frequency when said device is at said maximum position.

6. The control system of claim 3 wherein said control module increases said frequency of said first signal waveform from a first frequency when said device is at said minimum position to a second frequency when said device is at said maximum position and wherein said control module decreases said frequency of said second signal waveform from said first frequency when said device is at said minimum position to a third frequency that is less than said first frequency when said device is at said maximum position.

7. The control system of claim 3 wherein said control module increases said frequency of said first signal waveform from a first frequency when said device is at said minimum position to a second frequency when said device is at said maximum position and wherein said control module decreases said frequency of said second signal waveform from said second frequency when said device is at said minimum position to a third frequency that is between said first and second frequencies when said device is at said maximum position.

8. The control system of claim 3 wherein said control module compares said frequencies of said first and second signal waveforms and activates an alarm indicator when a sum of said frequencies of said first and second signal waveforms is at least one of greater than a first predetermined frequency and/or less than a second predetermined frequency.

9. The control system of claim 8 wherein a first resolution of said first position sensor is greater than a second resolution of said second position sensor and wherein said control module applies a weighting factor to one of said frequency of said first signal waveform or said frequency of said second signal waveform before comparing said frequencies of said first and second signal waveforms.

10. The control system of claim 2 wherein said sensor module increases both of said frequency of said first signal waveform and said frequency of said second signal waveform as said device moves from said minimum position to said maximum position.

11. The control system of claim 2 wherein said second module decreases both of said frequency of said first signal waveform and said frequency of said second signal waveform as said device moves from said minimum position to said maximum position.

12. The control system of claim 2 wherein said first and second signal waveforms are one of square, triangular, trapezoidal, or sinusoidal waveforms.

13. The control system of claim 2 wherein said control module detects voltage bias conditions in said first and second signal waveforms.

14. The control system of claim 2 wherein a first resolution of said first position sensor is greater than a second resolution of said second position sensor and wherein said control module applies a weighting factor to one of said first position value or said second position value to compare said first and second position values.

15. The control system of claim 2 further comprising first and second conductors having first ends that communicate with said sensor module and second ends that communicate with said control module, wherein said control module transmits said first signal waveform on said first conductor and said second signal waveform on said second conductor.

16. The control system of claim 2 wherein said control module compares said first and second position values and activates an alarm indicator when a difference between said first and second position values is greater than a predetermined value.

17. The control system of claim 2 wherein said control module converts said first and second position values into first and second normalized values that represent a fraction of a range between said minimum and maximum positions of said device.

18. The control system of claim 17 wherein said control module compares said first and second normalized values and activates an alarm indicator when a difference between said first and second normalized values is greater than a predetermined value.

19. The control system of claim 2 wherein said control module includes a frequency filter that detects frequency shifting in said first signal waveform and/or said second signal waveform.

20. The control system of claim 19 wherein said frequency filter is one of a low pass filter or a bandpass filter.

21. The control system of claim 2 wherein said device is one of an accelerator pedal, a brake pedal, a clutch pedal, or a throttle blade of a vehicle.

22. A method for operating a control system, comprising:
sensing a position of a device with a first position sensor, wherein said position of said device is between minimum and maximum positions and wherein said first position sensor generates a first position value;
sensing said position of said device with a second position sensor, wherein said second position sensor generates a second position value;
generating a first signal waveform based on said first position value;
generating a second signal waveform based on said second position value;
varying a frequency of said first signal waveform based on said first position value;
varying a frequency of said second signal waveform based on said second position value;
transmitting said first and second signal waveforms to a control module; and
determining said first and second position values at said control module based on said frequencies of said first and second signal waveforms, respectively.

23. The method of claim 22 further comprising increasing said frequency of said first signal waveform and decreasing said frequency of said second signal waveform as said device moves from said minimum position to said maximum position.

24. The method of claim 23 further comprising:
increasing said frequency of said first signal waveform from a first frequency when said device is at said minimum position to a second frequency when said device is at said maximum position; and
decreasing said frequency of said second signal waveform from said second frequency when said device is at said minimum position to said first frequency when said device is at said maximum position.

25. The method of claim 23 further comprising:
increasing said frequency of said first signal waveform from a first frequency when said device is at said minimum position to a second frequency when said device is at said maximum position; and
decreasing said frequency of said second signal waveform from a third frequency that is between said first and second frequencies when said device is at said minimum position to a fourth frequency that is less than said first frequency when said device is at said maximum position.

26. The method of claim 23 further comprising:
increasing said frequency of said first signal waveform from a first frequency when said device is at said minimum position to a second frequency when said device is at said maximum position; and
decreasing said frequency of said second signal waveform from said first frequency when said device is at said minimum position to a third frequency that is less than said first frequency when said device is at said maximum position.

27. The method of claim 23 further comprising:
increasing said frequency of said first signal waveform from a first frequency when said device is at said minimum position to a second frequency when said device is at said maximum position; and
decreasing said frequency of said second signal waveform from said second frequency when said device is at said minimum position to a third frequency that is between said first and second frequencies when said device is at said maximum position.

28. The method of claim 23 further comprising:
comparing said frequencies of said first and second signal waveforms; and
activating an alarm indicator when a sum of said frequencies of said first and second signal waveforms is at least one of greater than a first predetermined frequency and/or less than a second predetermined frequency.

29. The method of claim 28 further comprising applying a weighting factor to one of said frequency of said first signal waveform or said frequency of said second signal waveform before comparing said frequencies of said first and second signal waveforms, wherein a first resolution of said first position sensor is greater than a second resolution of said second position sensor.

30. The method of claim 22 further comprising increasing both of said frequency of said first signal waveform and said frequency of said second signal waveform as said device moves from said minimum position to said maximum position.

31. The method of claim 22 further comprising decreasing both of said frequency of said first signal waveform and said frequency of said second signal waveform as said device moves from said minimum position to said maximum position.

32. The method of claim 22 wherein said first and second signal waveforms are one of square, triangular, trapezoidal, or sinusoidal waveforms.

33. The method of claim 22 further comprising detecting voltage bias conditions in said first and second signal waveforms at said control module.

34. The method of claim 22 further comprising applying a weighting factor to one of said first position value or said second position value to compare said first and second position values, wherein a first resolution of said first position sensor is greater than a second resolution of said second position sensor.

35. The method of claim 22 further comprising:
transmitting said first signal waveform to said control module on a first conductor; and
transmitting said second signal waveform to said control module on a second conductor.

36. The method of claim 22 further comprising:
comparing said first and second position values at said control module; and
activating an alarm indicator when a difference between said first and second position values is greater than a predetermined value.

37. The method of claim 22 further comprising converting said first and second position values into first and second normalized values at said control module that represent a fraction of a range between said minimum and maximum positions of said device.

38. The method of claim 37 further comprising:
comparing said first and second normalized values; and
activating an alarm indicator when a difference between said first and second normalized values is greater than a predetermined value.

39. The method of claim 22 further comprising detecting frequency shifting in said first signal waveform and/or said second signal waveform with a frequency filter at said control module.

40. The method of claim 39 wherein said frequency filter is one of a low pass filter or a bandpass filter.

41. The method of claim 22 wherein said device is one of an accelerator pedal, a brake pedal, a clutch pedal, or a throttle blade of a vehicle.

* * * * *